3,479,201
COLOR-COATED ROOFING GRANULES
Robert J. Sloan, White Bear Lake, Minn., assignor to Minnesota Mining and Manufacturing Company, St. Paul, Minn., a corporation of Delaware
No Drawing. Filed Jan. 18, 1966, Ser. No. 521,446
Int. Cl. B44c 1/06; B44d 1/46
U.S. Cl. 117—27  6 Claims

ABSTRACT OF THE DISCLOSURE

Artificially color-coated roofing granules and a process for preparing the same wherein an alkali silicate, used to bind coloring pigment to mineral granules, is insolubilized by heat firing the coated granules to cause the alkali silicate to co-react with any two of cryolite, an oxygen containing boron compound, and calcium carbonate without fusing the reactants. The calcium carbonate, when present, is included in a precoat, while the other two reactants, when present, are included with the coloring pigment in the top coating of the granules.

---

This invention relates to artificially color-coated mineral roofing granules wherein the color coatings are formed from heat-treated insolubilized pigmented alkali silicate compositions.

Roofing materials that comprise brightly colored roofing granules contribute greatly to the aesthetic appearance of building structures and are extensively used by the building industry. Such roofing materials, however, are subjected to severe and extreme weather conditions, and the roofing granules are required to maintain their attractive appearance while enduring such punishment over a period of many years. To satisfy this requirement, the color-coating compositions that are applied to the granules must aggressively bond to the granules, they must resist staining, and they must be insoluble to minimize the rate of degradation.

Basically, the color-coating compositions are comprised of a coloring pigment and a binder. The binders that are commonly used, having been found suitable for securing and maintaining the desired aggressive bond with mineral roofing granules, are alkali silicate compositions. However, alkali silicates are intolerably soluble, and thus, the compositions must be processed so as to render them insoluble. Such processing is conventionally achieved by adding reactants to the composition which, under specified conditions, will react with the alkali silicate and cause the desired insolubilization.

The more popular reactants are comprised of heat reactive materials which are included in the base coating composition. Such compositions are coated onto the mineral granule, and then fired at a temperature sufficiently high to cause the said reactive material to react with the alkali silicate. Jewett, U.S. Patent No. 2,379,358, granted June 26, 1945, discloses that a heat reactive clay will react with and neutralize the alkali when fired at temperatures of about 1000° F. This process is generally referred to in the trade as the silicate-clay process.

In the Jewett process, the reaction between the alkali silicate and heat reactive clay at the high firing temperatures results in a highly intumesced or porous color coating. Thus, the granules absorb oils and other discoloring materials and thereby become stained. Whereas asphalt based roofing is extensively used and whereas asphalt contains such stain inducing oils, the porosity of the Jewett granules is highly objectionable. Such staining is obviously more objectionable on light colored granules, and in view of the increased public interest in light-colored roofing, the problem in recent years has become accented.

Such undesirable staining has, however, been a problem in the manufacture of colored roofing granules for many years. The correlation between porosity and staining has long been known, and it accordingly has been recognized that a substantial advantage could be realized by successfully developing a process which would enable the alkali silicate of the color coating to be insolubilized at a lower firing temperature to thereby reduce the porosity of coated granules.

One method of insolubilization that is used effectively with a low firing temperature is known as an acid salt pickle process. This process, however, causes a water soluble residue to form on the granules which reduces the adhesion of the granules to the asphalt substrate of the roofing when water is present.

A substantial advance in the art was made by the invention disclosed in the Lodge-Fehner application Ser. No. 213,101, now U.S. Patent No. 3,255,031, granted on June 7, 1966. That invention involved the addition of an oxygen containing boron compound, e.g. borax, to the alkali silicate-pigment-clay composition, which surprisingly caused the alkali to be insolubilized at a substantially lower temperature than the 1000° F. firing temperature of the Jewett process. The porosity of the coating was substantially lowered because of the reduced firing temperatures, and the objectionable staining was accordingly reduced.

The granules coated by the Lodge-Fehner process, however, are still somewhat porous, and although the staining problem was significantly reduced, there continued to be a need for improvement. It is believed that the heat reactive clay necessary in both the Jewett and Lodge et al. processes, although accomplishing neutralization and insolubilization of the alkali silicate, materially contributes to the porosity of the coating because it is inherently an absorptive solid. Furthermore, such heat reactive clay does not sufficiently react at temperatures less than about 700° F., and at such temperatures, the reaction between the clay and alkali silicate causes the coating to become intumesced.

An improved color-coated granule is provided by the present invention which discloses a process that does not depend on the heat reactive clay nor on acid salt pickle, insolubilizing the alkali silicate, resulting in a color coating having the desired properties of the Jewett and Lodge et al. processes but with less porosity. In general, my invention is derived from the surprising discovery that when certain heat reactive materials are properly combined, they will produce an insoluble color coating with substantially reduced porosity at firing temperatures from about 500° F. to 700° F.

Although I do not wish to be bound by this theory, apparently for some unknown reason, each of the reactive materials when used independently reacts only partially with the alkali silicate at the reduced firing temperatures. But when the ingredients are combined, the said partial reactions are cumulative and the total reaction is sufficient to achieve the desired neutralization.

In the preferred embodiment of my invention, I apply a precoating on the raw mineral granules which comprises the known ingredient of an alkali silicate binder, a suitable pigment, and heat reactive clay, with the additional ingredient calcium carbonate (a minimum of 6–8 lbs. per ton of granules). This precoating is fired to about 850–1000° F. Then the outer coating is applied directly over the precoating and comprises known ingredients of an alkali silicate binder, coloring pigment, borax and the additional ingredient cryolite (about 1–3 lbs. per ton of granules). The granules are fired to about 500° F. and the coating is found to be suitably insoluble and non-porous.

The existence of the calcium carbonate in the precoating in addition to the borax and cryolite in the outer coating is considered important to the preferred process. The effect of the calcium carbonate in the precoating is completely unexpected. It has been found that the same desirable effect is not achieved if the calcium carbonate is added to the outer coating. In such case, the calcium carbonate merely tends to increase the porosity of the outer coating. For some reason, the calcium carbonate, when fired at the high temperatures following the precoating application, becomes reactive with the alkali silicate of the outer coating in some way unachievable by adding additional amounts of borax and cryolite to the outer coating. Thus, it is found that when the calcium carbonate of the precoating is deleted, the firing temperature of the outer coating must be raised to about 600° F. to achieve similarly satisfactory insolubilization.

A preferred type of calcium carbonate for use in this invention is a —300 mesh precipitated product designated as Suspenso Calcium Carbonate obtainable from Diamond Alkali Company, Cleveland, Ohio.

It is pointed out that the borax and cryolite combination, without the precoating containing calcium carbonate, provides a highly satisfactory coating at a 600° F. firing temperature. I believe the cryolite combined with the borax cumulatively reacts with the alkali silicate better than any prior known reactive combination, e.g. the borax plus clay reaction of the Lodge-Fehner invention. As mentioned, the reactive effect of the clay falls off rapidly at temperatures below 700° F. and furthermore contributes to the porosity. The cryolite, however, produces the desired reaction at the 600° F. level and contributes very little to the porosity.

It is also found that where the calcium carbonate of the precoating is maintained, suitable insolubilization can be achieved with borax as the only reactive agent in the outer coating, but with a 600° F. firing temperature. This coating with a 600° F. firing temperature is less porous, for the same reasons given above, than one made with a clay-borax combination fired at 700° F.

The use of calcium carbonate in the precoating and cryolite (about 5 lbs. per ton of granules) as the only reactant in the outer coating produces satisfactory granules at 700° F. firing temperatures, as compared with the clay-borax composition at 700° F. firing temperature. The coating of the former, however, is less porous.

I will now set forth specific examples for illustrating various of the forms of my invention, but not to limit it:

EXAMPLE I

A precoat composition is prepared in accordance with the following formulation:

| Constituents: | Pounds |
| --- | --- |
| $TiO_2$ | 15 |
| Kaolin | 50 |
| $CaCO_3$ | 8 |
| "K" brand aqueous sodium silicate (comprising 42.9% solids with $Na_2O:SiO_2$ ratio equals 1:2.9) | 65 |
| Water | 24 |

The ingredients of the coating composition are first mixed together, following which the composition is applied to 2000 pounds of #11 grade (—10 +35 mesh) granules, for example, syenite, diabase, greystone, or like granules, in a tumbing barrel-type mixer. The coating is then predried, by passing air through the mixer, until the coated granules are free-flowing, all in accordance with conventional practice, after which the granules are transferred to a rotary kiln and fired at 900° F., dwell time in the kiln being about 20 minutes. The granules are then cooled in a rotary cooler.

In the meantime a second coating composition is prepared by mixing ingredients in accordance with the following formulation:

| Constituents: | Pounds |
| --- | --- |
| $TiO_2$ | 16 |
| Sodium tetraborate decahydrate (borax) | 4 |
| Cryolite | 1.5 |
| "K" brand aqueous sodium silicate (42.9% solids) | 45 |
| Water | 22 |

The second coating composition is applied to the cooled precoated granules by similar procedures as followed in the application of the first coating, following which the granules are fired in a rotary kiln at 500° F., to insolubilize the coating. The granules are again cooled in a rotary cooler, where suitable slate oil or adhesive treatments are applied, as desired.

EXAMPLE II

A precoat composition is prepared in accordance with the following formulation:

| Constituents | Pounds |
| --- | --- |
| $TiO_2$ | 15 |
| Kaolin | 30 |
| $CaCO_3$ | 30 |
| "K" brand aqueous sodium silicate | 65 |
| Water | 28 |

The ingredients of the coating composition are mixed and applied to 2000 pounds of #11 syenite, diabase, greystone or like (—10 +35 mesh) granules by similar procedures as followed in Example I, the granules are dried and fired at 900° F.

The second coating composition having the same formulation as the second coating composition in Example I is mixed and applied to the cooled precoating, followed which, the granules are fired in a rotary kiln at 500° F. The granules are again cooled and suitable oil or treatments are applied as desired.

EXAMPLE III

A precoating composition having the same formulation as Example I, which includes 8 pounds of calcium carbonate is mixed and applied to granules and the granules are fired to 900° F. as in Example I.

A second coating composition is prepared by mixing ingredients in accordance with the following formulation:

| Constituents: | Pounds |
| --- | --- |
| $TiO_2$ | 16 |
| Sodium tetraborate decahydrate (borax) | 4 |
| "K" brand aqueous sodium silicate (42.9% solids) | 45 |
| Water | 24 |

The second coating composition is applied to the cooled precoated granules as in Example I, following which the granules are fired in a rotary kiln at 600° F. to insolubilize the coating. Granules are again cooled and suitable oil or treatments are applied as desired.

EXAMPLE IV

A precoat composition is prepared in accordance with the following formulation:

| Constituents: | Pounds |
| --- | --- |
| $TiO_2$ | 15 |
| Kaolin | 50 |
| "K" brand aqueous sodium silicate (42.9% solids) | 65 |
| Water | 25 |

The ingredients of the coating composition are mixed and applied to 2000 pounds of #11 grade syenite, diabase, greystone or like (—10 +35 mesh) granules by similar procedures as followed in Example I, the granules are dried and fired to 900° F.

The second coating composition is prepared by mixing ingredients in accordance with the following formulation:

| Constituents: | Pounds |
| --- | --- |
| TiO$_2$ | 15 |
| Sodium tetraborate decahydrate | 4 |
| Cryolite | 1.5 |
| "K" brand aqueous sodium silicate (42.9% solids) | 45 |
| Water | 22 |

The second coating composition is applied to the cooled precoated granules as in Example I, following which the granules are fired in a rotary kiln at 600° F. to insolubilize the coating. Granules are again cooled and suitable oil or treatments are applied as desired.

EXAMPLE V

A precoating composition having the same formulation as Example I, which includes 8 pounds of calcium carbonate, is mixed and applied to granules and the granules are fired to 900° F. as in Example I.

A second coating composition is prepared by mixing ingredients in accordance with the following formulation:

| Constituents: | Pounds |
| --- | --- |
| TiO$_2$ | 15 |
| Croylite | 5 |
| "K" brand aqueous sodium silicate (42.9% solids) | 45 |
| Water | 20 |

The second coating composition is applied to the cooled precoated granules as in Example I, following which the granules are fired in a rotary kiln at 700° F. to insolubilize the coating. Granules are again cooled and suitable oil or treatments are applied as desired.

EXAMPLE VI

A precoating composition having the same formulation as Example I, which includes 8 pounds of calcium carbonate is mixed and applied to granules and the granules are fired to 900° F. as in Example I.

A second coating composition is prepared by mixing ingredients in accordance with the following formulation:

| Constituents: | Pounds |
| --- | --- |
| TiO$_2$ | 16 |
| Sodium tetraborate decahydrate (borax) | 4 |
| Dover clay | 10 |
| "K" brand aqueous sodium silicate (42.9% solids) | 45 |
| Water | 24 |

The second coating composition is applied to the cooled precoated granules as in Example I, following which the granules are fired in a rotary kiln at 600° F. to insolubilize the coating. Granules are again cooled and suitable oil or treatments are applied as desired.

It will be noted that the second coating composition in Example VI contains Dover clay. This type of clay is more reactive than that which is used in the precoating and the coating in which it is used tends to be less porous. This material is available from the R. E. Carroll Co., Trenton, N.J.

EXAMPLE VII

A precoating composition having the same formulation as Example IV is mixed and applied to granules and the granules are fired to 900° F. as in Example IV.

A second coating composition is prepared by mixing ingredients in accordance with the following formulation:

| Constituents: | Pounds |
| --- | --- |
| TiO$_2$ | 16 |
| Sodium tetraborate decahydrate (borax) | 4 |
| Cryolite | 1.5 |
| Dover clay | 10 |
| "K" brand aqueous sodium silicate (42.9% solids) | 45 |
| Water | 24 |

The second coating composition is applied to the cooled precoated granules as in Example I, following which the granules are fired in a rotary kiln to 600° F. to insolubilize the coating. Granules are again cooled and suitable oil or treatments are applied as desired.

EXAMPLE VIII

A precoating composition having the same formulation as Example I, which includes 8 pounds of calcium carbonate, is mixed and applied to the granules and the granules are fired to 900° F. as in Example I.

A second coating composition is prepared by mixing ingredients in accordance with the following formulation:

| Constituents: | Pounds |
| --- | --- |
| TiO$_2$ | 16 |
| Sodium tetraborate decahydrate (borax) | 4 |
| Cryolite | 1.5 |
| Dover clay | 5 |
| "K" brand aqueous sodium silicate (42.9% solids) | 45 |
| Water | 24 |

The second coating composition is applied to the cooled precoated granules as in Example I, following which the granules are fired in a rotary kiln at 500° F. to insolubilize the coating. Granules are again cooled and suitable oil or treatments are applied as desired.

The granules that have been coated, as set forth in the above examples, are substantially non-porous and highly stain resistant as compared with other formulations and processes known to the art, for example, those disclosed in the Jewett Patent No. 2,379,358 and the Langseth-Lodge Patent No. 3,208,871.

It is understood that numerous other ingredients, other reactants, etc., can be added to the coating compositions without departing from my invention. Also, that one, two, three, or more precoatings may be applied to the granule prior to the outer coating described herein (at least one precoating being preferred). Thus, it is believed that my invention includes the discovery that a cumulative reactive effect is achieved by a specified combination of reactants when fired at reduced temperatures, which the individual reactants are not able to achieve satisfactorily.

The coating compositions disclosed herein have been found to be useful for color coating surfaces other than roofing granules. For example, they have been used to coat sheet aluminum, and are also believed useful for coating such materials as steel, ceramic bodies, asbestos cement articles, etc.

What I claim is:

1. A color-coated granule comprising a base mineral granule having firmly bonded thereto an insolubilized precoat layer containing alkali silicate and calcium carbonate and having a surface layer bonded to the precoat layer of a pigmented coating composition comprising the insolubilized reaction product of a soluble alkali silicate and at least one member selected from the class consisting of:

(a) oxygen containing boron compound and (b) cryolite.

2. The granule of claim 1 wherein both said oxygen boron containing compound and said cryolite are present in said pigmented coating composition.

3. A composite sheet body for roofing and siding comprising a bituminous sheet material having a firmly adherent surfacing comprising color-coated granules as defined in claim 1.

4. A composite sheet body for roofing and siding, comprising a bituminous sheet material having a firmly adherent surface comprising color-coated granules as defined in claim 2.

5. A process for preparing artificially color-coated granules which comprise the steps of:

(1) coating said granules with a first composition comprising an alkali silicate, heat reactive clay, and an excess of calcium carbonate,
(2) heat firing granule coated with said first composition to insolubilize said alkali silicate,
(3) applying a second composition comprising an alkali silicate, pigment, and at least one member of the group consisting of (a) and oxygen containing boron compound, and (b) cryolite; and
(4) heat firing said granule to insolubilize said alkali silicate in said second composition without fusing the ingredients thereof.

6. The process of claim 5 wherein both said oxygen containing boron compound and said cryolite are present in said second composition.

References Cited

UNITED STATES PATENTS

| | | | |
|---|---|---|---|
| 1,766,815 | 6/1930 | Fisher | 117—100 |
| 2,033,656 | 3/1936 | Smith | 117—100 |
| 2,054,317 | 9/1936 | Gundlach | 117—100 X |
| 2,061,338 | 11/1936 | Ward | 117—100 X |
| 2,070,359 | 2/1937 | Hillers | 117—100 X |
| 2,163,678 | 6/1939 | Gundlach | 117—100 X |

MURRAY KATZ, Primary Examiner

W. R. TRENOR, Assistant Examiner

U.S. Cl. X.R.

117—32, 70, 100